United States Patent
Gadiya et al.

(10) Patent No.: US 10,073,767 B2
(45) Date of Patent: Sep. 11, 2018

(54) TRACE MANAGEMENT

(71) Applicant: Pivotal Software, Inc., San Francisco, CA (US)

(72) Inventors: Mukesh Gadiya, Sunnyvale, CA (US); James Thomas Bayer, Palo Alto, CA (US); Justin Keith Roozeboom, Broomfield, CO (US)

(73) Assignee: Pivotal Software, Inc., San Francisco, CA (US)

( * ) Notice: Subject to any disclaimer, the term of this patent is extended or adjusted under 35 U.S.C. 154(b) by 46 days.

(21) Appl. No.: 15/409,300

(22) Filed: Jan. 18, 2017

(65) Prior Publication Data

US 2018/0203795 A1 Jul. 19, 2018

(51) Int. Cl.
*G06F 11/36* (2006.01)
*H04L 29/08* (2006.01)

(52) U.S. Cl.
CPC ...... *G06F 11/3692* (2013.01); *G06F 11/3636* (2013.01); *H04L 67/02* (2013.01)

(58) Field of Classification Search
CPC ... G06F 11/3692; G06F 11/3626; H04L 67/02
USPC .......................................................... 717/128
See application file for complete search history.

(56) References Cited

U.S. PATENT DOCUMENTS

| | | | |
|---|---|---|---|
| 6,282,701 B1 | 8/2001 | Wygodny et al. | |
| 2003/0056199 A1 | 3/2003 | Li et al. | |
| 2008/0091978 A1* | 4/2008 | Brodsky | G06F 11/3466 714/38.14 |
| 2011/0145800 A1 | 6/2011 | Rao et al. | |
| 2012/0221739 A1* | 8/2012 | Schroeder, Jr. | G06F 9/468 709/229 |
| 2012/0255038 A1* | 10/2012 | Havercan | G06F 21/52 726/30 |
| 2012/0297485 A1* | 11/2012 | Maeda | G06F 21/52 726/23 |

(Continued)

FOREIGN PATENT DOCUMENTS

EP 2 508 997 10/2012

OTHER PUBLICATIONS

Sigelman, et al., "Dapper, a Large-Scale Distributed Systems Tracing Infrastructure," Google Technical Report dapper-2010-1, Apr. 2010, 14 pages.

(Continued)

*Primary Examiner* — Anna Deng
(74) *Attorney, Agent, or Firm* — Fish & Richardson P.C.

(57) ABSTRACT

Systems, methods, and computer program products for trace management in a distributed computing environment are described. A trace manager receives a request to analyze a trace of a series of calls between applications serving requests in a microservice architecture. The trace manager determines metrics including, for example, latency information and start time for the series of calls. The trace manager presents the metrics in association with log entries correlated to the series of calls. A call stack, or one or more latency indicators, provides a user interface of selecting one or more calls. A user selection of a particular call in the call stack or a latency indicator causes one or more corresponding log entries to be emphasized or filtered. The call stack and the one or more latency indicators can have various display configurations.

20 Claims, 7 Drawing Sheets

(56) References Cited

U.S. PATENT DOCUMENTS

2016/0246701 A1* 8/2016 Revanna ............. G06F 11/3636
2018/0007073 A1* 1/2018 Boutnaru ............ H04L 63/1416

OTHER PUBLICATIONS

International Search Report and Written Opinion in International Application No. PCT/US2018/013964, dated Apr. 26, 2018, 21 pages.

* cited by examiner

TRACE MANAGEMENT

This disclosure generally relates to web applications performance troubleshooting.

In web application software development, tracing can be used to identify performance problems, e.g., latency issues. A software developer can use tracing to record information generated by a software program. The information can include low-level events such as thrown exceptions. The developer can use this information to determine what caused the exceptions to be thrown and what caused latency in execution.

Many modern Internet applications are implemented on distributed systems, where various functionalities are performed by different software modules developed by different teams and run on different hosts. The modules can communicate with each other using communication protocols such as HTTP (Hypertext Transfer Protocol). Distributed tracing tools that can record information across the modules can help a developer identify a performance issue on any host. An example of a distributed tracing tool is Zipkin, which can provide tracing functionalities in a microservice-based architecture.

SUMMARY

This specification describes techniques of trace management in a distributed computing environment. A trace manager receives a request to analyze a trace of a series of calls between applications serving requests in a microservice-based architecture. The trace manager determines metrics including, for example, latency information and start time for the series of calls. The trace manager presents these metrics in association with log entries correlated with the series of calls. A call stack provides a user interface of selecting one or more calls. A user selection of a particular call in the call stack causes only the log entries for that call to be emphasized. The call stack can have various display configurations. For example, the call stack can be displayed in a stack mode, in a sorted mode, or, when a user of the trace manager does not have access privileges to all microservices providing the applications, in a multi-tenancy mode.

The subject matter described in this specification can be implemented in various embodiments so as to realize one or more of the following advantages. For example, the disclosed techniques provide easy access to trace information by allowing a user to see a trace view of a specific request by clicking a link from a performance monitoring view of an application which is part of the trace.

The disclosed techniques can show latency metric and logs in an integrated view for a trace from all applications that are part of the trace, thereby give a user a holistic view of the trace. The disclosed techniques can display dependency graphs to show the exact call order within a trace. The disclosed techniques allow a user to sort latency visualization graphs by dependency, start time, latency. The disclosed techniques allow a user to filter application logs by HTTP requests. If a logged-in user does not have permissions on certain applications that are part of trace, the trace manager can hide logs for those applications as well as removing those applications from the latency visualization and dependency graphs.

The disclosed techniques improve upon conventional tracing technology in that the disclosed techniques solve a microservice monitoring problem of how to present all relevant information together to help a developer troubleshoot a system comprised of many microservices. The developer needs to trace a request through all microservices to pinpoint which microservice surfaced an issue, and which request caused the issue. Latency visualization combined with logs for an entire trace can solve this technical problem. Accordingly, compared to microservice platforms using conventional tracing technology, the disclosed techniques can lead to a better platform to run microservices, by improving the ability to monitor and troubleshoot the microservices.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
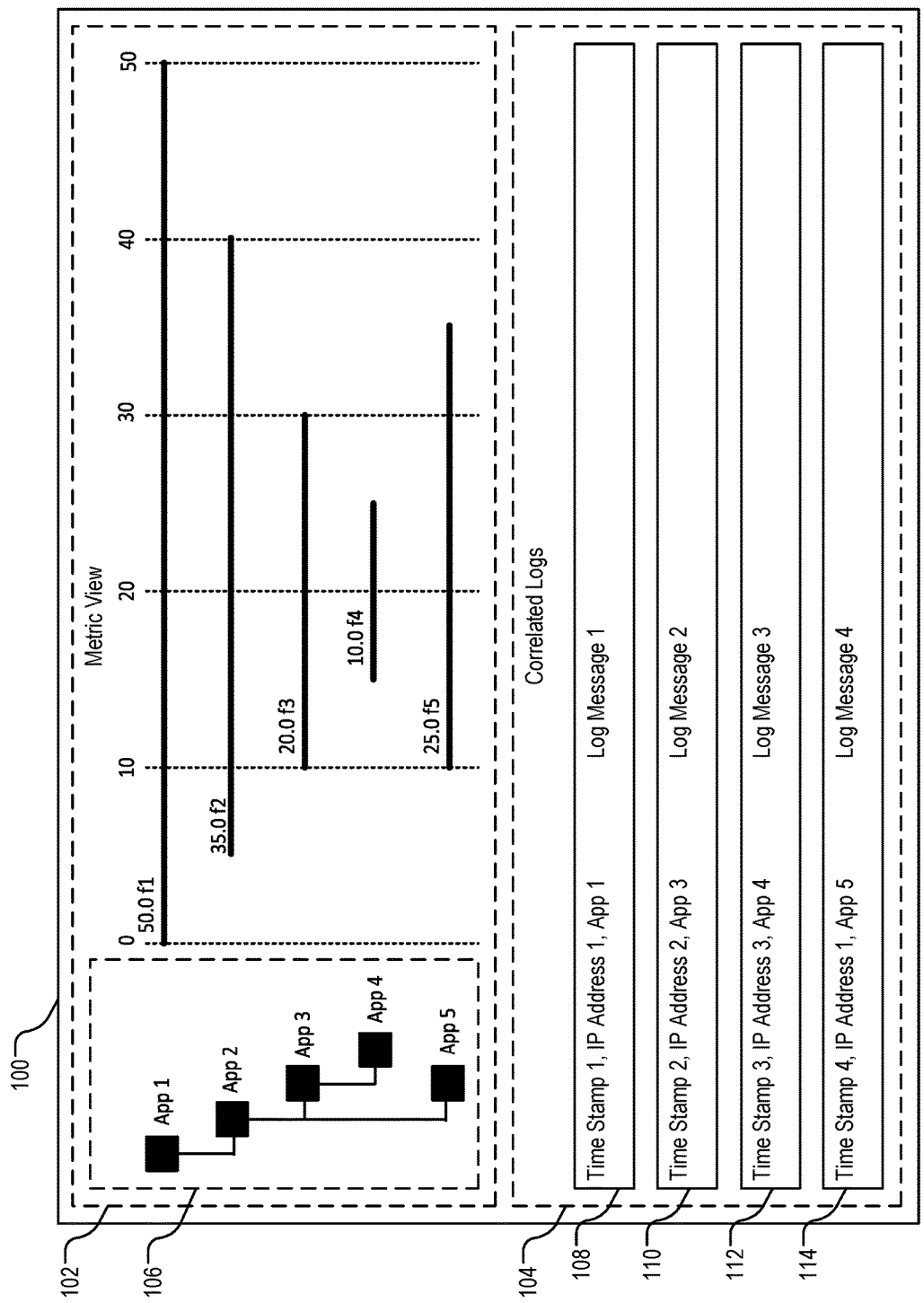
FIG. 1 illustrates an example user interface of a trace manager.

FIG. 1 illustrates an example user interface 100 of a trace manager. The trace manager is implemented on a distributed computing platform including one or more computer processors. In response to a request to troubleshoot potential latency issues, the trace manager can present the user interface 100 on a display device.

The request to troubleshoot latency issues can originate from a tracing program, a logging program or a performance measurement program. For example, a logging program displays one or more log entries. Each log entry can be generated by a function of an application. Some log entries are associated with functions or applications for which tracing is enabled. These log entries, when displayed, are selectable. In response to a selection of a log entry for which tracing is enabled, the trace manager activates to present the user interface 100, which corresponds to the trace of the selected log entry.

The trace manager is configured to trace calls across microservices. The microservices can include processes providing various functions and communicate with one another through a network. Each process can include one or more applications. In the example shown, the trace manager presents the user interface 100 for viewing a trace that includes calls between five applications named, for illustrative purposes, App 1 through App 5. Each of the five applications can generate one or more respective log entries. An application may call another application. Calling an application includes submitting a request to the application and receiving a response from the application. The call has a latency, which is a time delay between submitting the request and receiving the response.

The trace manager displays a status pane 102 and a log pane 104 in the user interface 100. The status pane 102 is a portion of a displayed view configured to display a call stack 106 and metrics. The dashed frames shown in the figures are for convenience of referencing. The status pane 102 may or may not have a frame.

The call stack 106 includes representations of the applications in the trace. The call stack 106 can include a dependency graph representing relationship between the applications, include which application calls which other application. The dependency graph can have a tree structure. In the example shown, the call stack 106 includes a dependency graph representing a call structure where App 1 calls App 2, which, in turn, calls App 3 and App 5, where App 3 calls App 4. Each of the applications is represented by a respective marker in the call stack 106. The marker may be connected by lines having appearances similar to branches of a tree.

The metrics in the status pane 102 include various measurements of the calls. In the example shown, the metrics include latency measurements. The latency can be measured in milliseconds (ms). A latency indicator, e.g., a horizontal bar, represents the latency of a call. The length of the bar represents the amount of the latency. For example, in a first call, a first application App 1 submits a request to the second application App 2 at time 0 ms. The request invokes a function "f1" of the second application App 2. The first application App 1 receives a response at the time of 50 ms. Accordingly, the first call has a latency of 50ms.

At the 5th ms, the second application App 2 makes a second call to the application App 3. Making the second call includes submitting a second request from the second application App 2 to the third application App 3 to invoke function "f2." The second call has a latency of 35 ms. The trace manager represents the latencies of the first call and second call using latency indicators, which are horizontal bars in the example shown. Accordingly, in the status pane 102, the call stack 106 and the latency indicators provide an integrated view of call dependencies and call latencies.

The log pane 104 of the user interface 100 displays one or more log entries, e.g., log entries 108, 110, 112 and 114. Each of the log entries 108, 110, 112 and 114 includes a respective timestamp at which the corresponding log entry is entered, a respective IP (Internet protocol) address where the corresponding log entry is entered, an application identifier of an application that made the call that generated the log entry, and a corresponding log message. Some calls may not generate log entries. In the example shown, the log entries 108, 110, 112 and 114 are generated by the calls from applications App 1, App 3, App 4 and App 5, respectively. The log entries 108 and 114 have the same IP address, indicating that App 1 and App 5 run on a same host.

The status pane 102 and the log pane 104 are linked to one another, forming an integrated view for presenting status of applications and calls in a trace. For example, selecting an application in the status pane 102 causes a corresponding log entry in the log pane 104 to be selected. Likewise, selecting a log entry in the log pane 104 causes a corresponding application in the status pane 102 to be selected. Additional details of the interactions between items in the status pane 102 and the log pane 104 are described in reference to FIG. 2.

Figure 2:
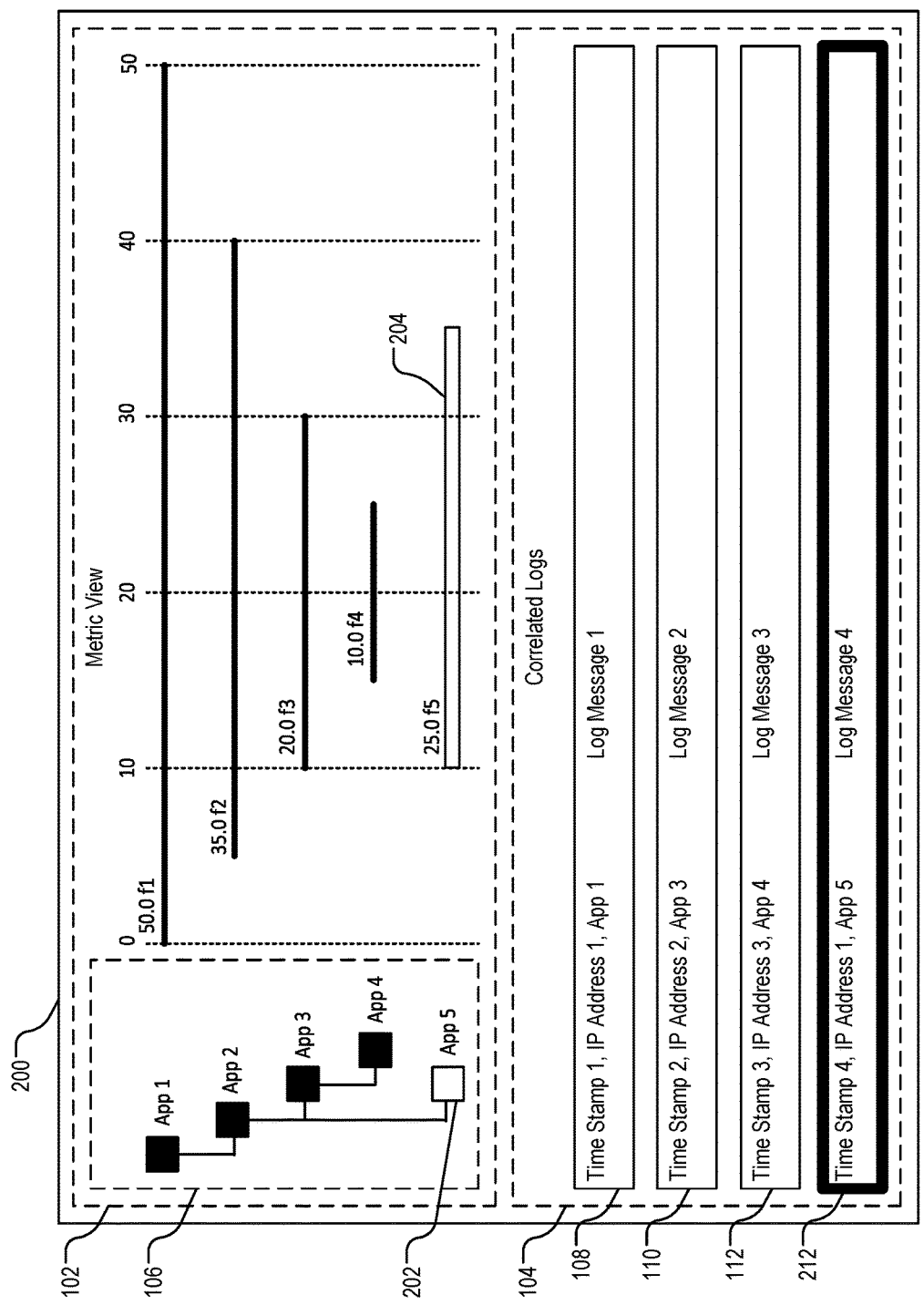
FIG. 2 illustrates an example user interface of a trace manager that accepts a user selection of an application.

FIG. 2 illustrates an example user interface 200 that accepts a user selection of an application. A trace manager can receive a selection input in a status pane 102. The selection input can be a touch input or a mouse click. In the example shown, an application in a trace, App 5, is selected. The trace manager receives the selection input touching, or clicking on, a marker 202 of the call stack 106 representing the application App 5. Alternatively or additionally, the trace manager receives the selection input touching, or clicking on, a latency indicator 204 associated with the application App 5.

In response to any one of the selection inputs, the trace manager emphasizes both the marker 202 and the latency indicator 204. Emphasizing the marker 202 and the latency indicator 204 can include highlighting the marker 202 and the latency indicator 204, to indicate that the application App 5 is selected. In addition, the trace manager can display an emphasized log entry 212 corresponding to the selected application. The trace manager can identify a log entry in a log repository using an identifier of the application. For example, the trace manager can perform a lookup in a log repository using an application name "App 5," using a process name or process identifier corresponding to the function call in the trace "f5" or using another form of identifier, e.g., a thread identifier. The trace manager retrieves corresponding log information from the log repository, including a timestamp, an IP address, an application identifier, and a log message. The trace manager generates the emphasized log entry 212 based on the log information. The trace manger presents the emphasized log entry 212 in the log pane 104.

Displaying the emphasized log entry 212 can include highlighting log entry. In some implementations, displaying the emphasized log entry 212 is associated with filtering out and hiding other log entries corresponding to applications not selected or corresponding to other functions in the same application that are not selected.

The trace manager can receive a selection input in the log pane 104. For example, the trace manager can receive a touch input or a mouse click on a log entry. In response, the trace manager emphasizes that log entry and displays, for example, the emphasized log entry 212. The trace manager identifies a corresponding function of an application that generated the log entry. In this example, a function "f5" of application "App 5" generated the log entry in a log repository. The log manager than emphasizes the marker 202 and the latency indicator 204 corresponding to the identified application and function.

Figure 3:
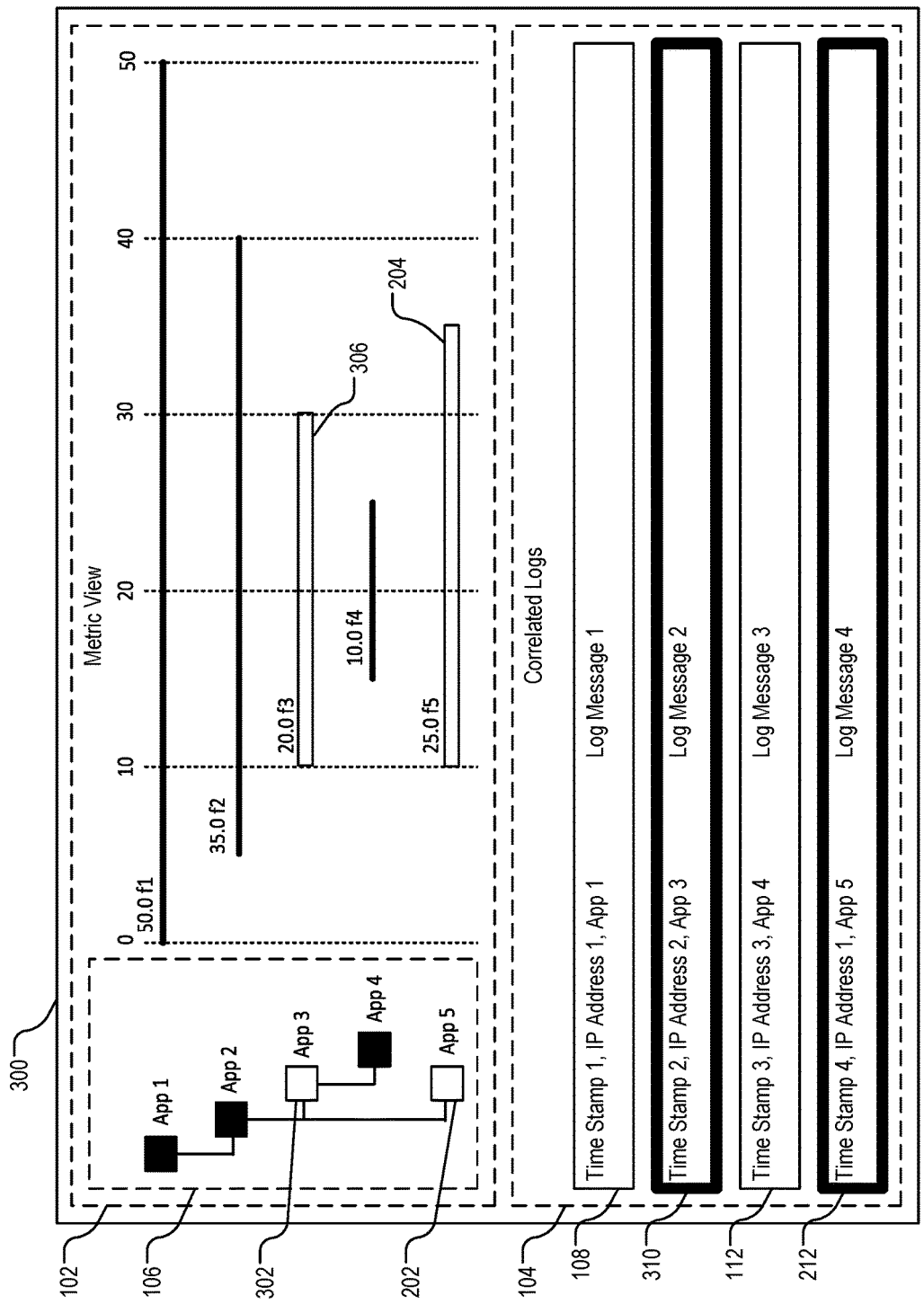
FIG. 3 illustrates an example user interface of a trace manager in a multi-selection mode.

FIG. 3 illustrates an example user interface 300 of a trace manager in a multi-selection mode. A trace manager can receive a multi-selection input in a status pane 102. The multi-selection input can include a multi-touch input or a series of mouse clicks. In the example shown, two applications in a trace, App 3 and App 5, are selected. The multi-selection input can include an input selecting both a marker 302 representing a first application, App 3, and a marker 202, representing a second application, App 5. The multi-selection input can include an input selecting both a latency indicator 306 representing the first application, App 3, and a latency indicator 204 representing a second application, App 5.

In response to the multi-selection input received in the status pane 102, the trace manager can identify log entries that correspond to the functions and the applications selected, and display the emphasized entries in the log pane 104. In the example shown, the trace manager displays emphasized log entries 310 and 212, corresponding to the functions "f3" and "f5" of the selected applications "App 3" and "App 5," respectively.

Likewise, the trace manager can receive a multi-selection input in a log pane 104. For example, the trace manager can receive a respective touch input or a mouse click on each of the log entries 310 and 212. In response, the trace manager emphasizes the log entries 310 and 212. The trace manager identifies corresponding functions of the applications that generated the log entries, in this example, function "f3" of the application "App 3" and function "f5 of the application "App 5." The log manager than emphasizes the markers 302 and 202. The log manager emphasizes the latency indicators 306 and 204. Thus, selecting one or more log entries in the log pane 104 triggers selection of one or more applications and functions in the call stack in the status pane 102. Likewise, selecting one or more applications and functions in the log pane 102 triggers selection of one or more log entries in the log pane 104.

Figure 4:
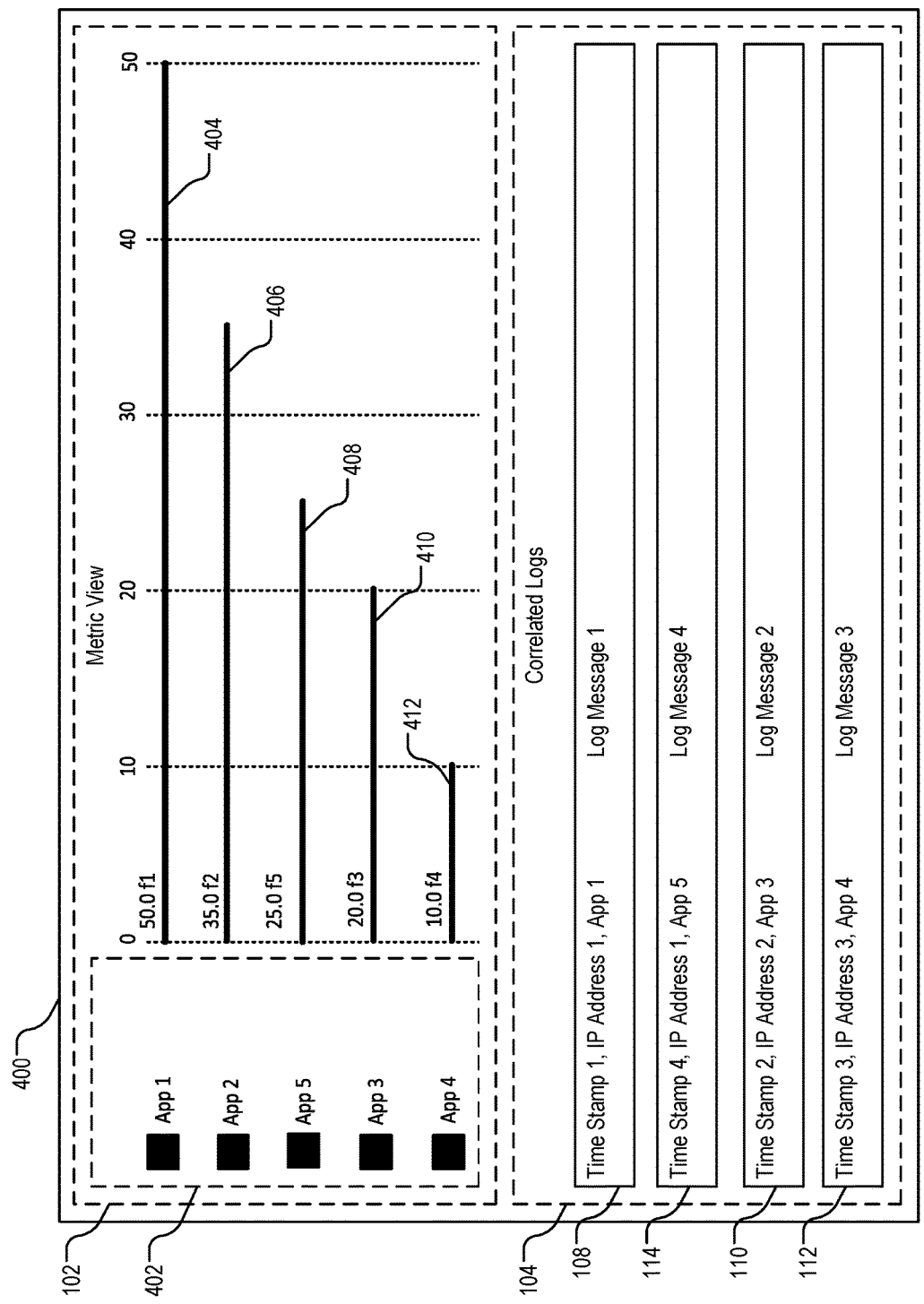
FIG. 4 illustrates an example user interface of a trace manager in a sort mode.

FIG. 4 illustrates an example user interface 400 of a trace manager in a sort mode. The trace manager can receive an input to sort applications and functions in the trace by latency time. The trace manager can receive the input in the status pane 102. In response to the input, the trace manager can change the displayed call stack 106 (of FIG. 1) into a call list 402. The call list 402 can include markers and labels representing applications in a current trace sorted by latency, in descending order or ascending order. The call list 402 differs from the call stack 106 in that the call list 402 does not necessarily represent a sequence of the calls and dependencies between the calls. Instead, the call list 402 emphasizes on amount of the latency, which provides helpful visualization to a trouble-shooting user. The trace manager can sort latency indicators 404, 406, 408, 410 and 412 in association with the applications.

The trace manager can sort log entries 108, 110, 112 and 114 in the log pane 104 to correspond to order of the applications as represented in the call list 402. The trace manager can trigger sorting of the log entries in response to the input to sort the applications. In this example, the log entries 108 and 114, corresponding to two calls having the longest latency, have a same IP address. This can provide a hint that the host having the IP address may be overloaded.

Figure 5:
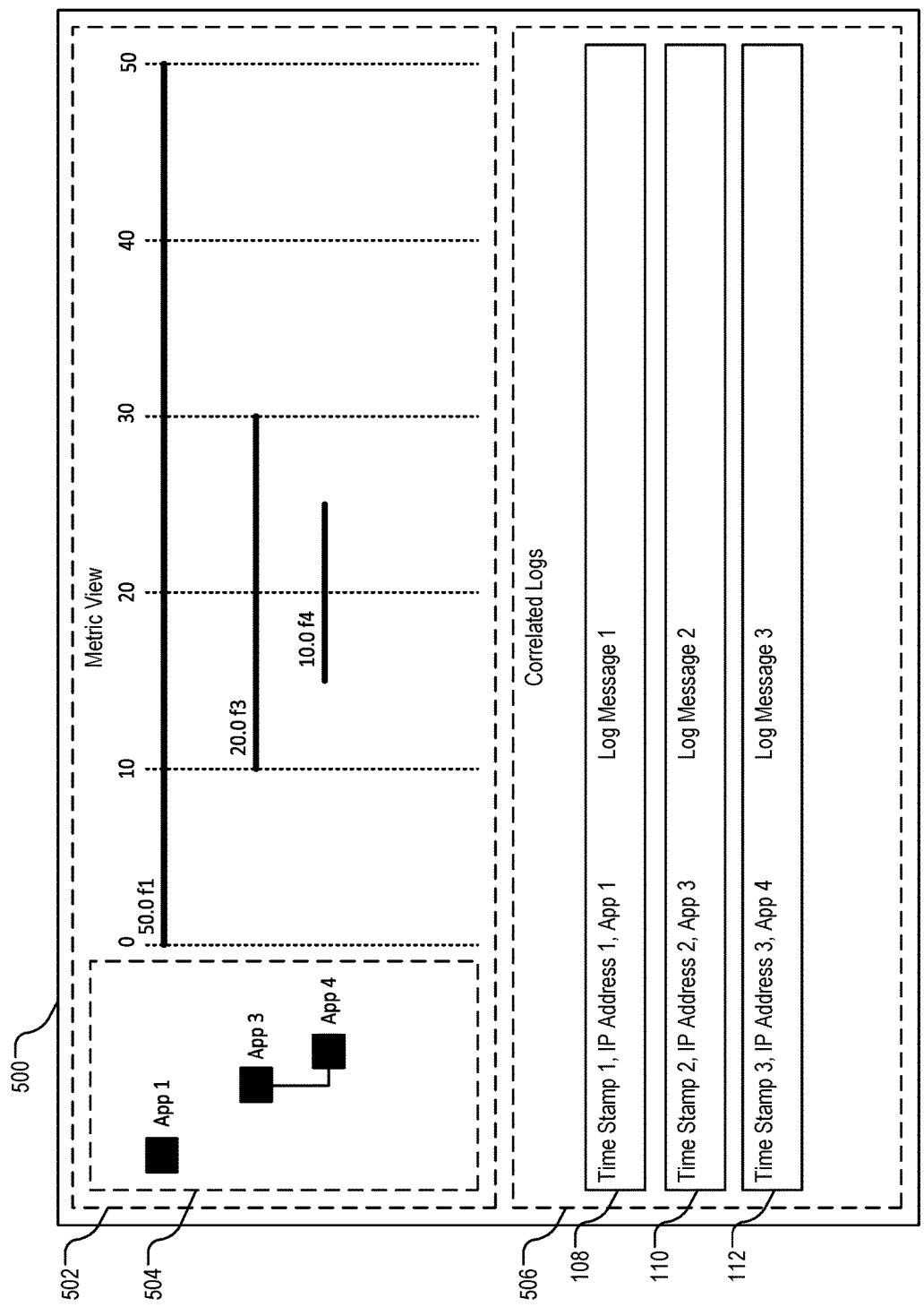
FIG. 5 illustrates an example user interface of a trace manager in a multi-tenancy mode.

FIG. 5 illustrates an example user interface 500 of a trace manager in a multi-tenancy mode. A software system in a trace may include multiple microservices. The microservices may be provided by multiple nodes of a distributed computing system. Each node may provide one or more microservices. A user viewing the user interface 500 of the trace manager may not have privileges to access all the nodes and all the microservices.

In the example shown, the trace manager receives credentials provided by a user who logged into the trace manager. The trace manager determines microservices providing and receiving the traced calls. The trace manager inquires the microservices about access privileges of the user. The trace manager receives responses. The responses indicate that the user has privileges to access applications App 1, App 3, and App 4. The responses indicate that the user does not have privileges to access App 2 or App 5. The lack of privilege may due to, for example, responsibility of a software module containing App 2 or App 5 belongings to other developers, the user not having access privileges to a cluster of nodes providing the microservice of App 2 or App 5, or these two applications being a part of a proprietary library.

Based on the response, the trace manage determines that the application App 2 shall be hidden from the user. Accordingly, the trace manager displays multi-tenant status pane 502 in the user interface 500. The multi-tenant status pane 502 includes a multi-tenant call stack 504. In the multi-tenant call stack 504, the trace manager displays those applications to which the user has access privilege, and hides those applications to which the user does not have access privilege. In this example, applications App 1, App 3, and App 4 are shown; App 2 and App 5 are hidden. The shown applications are represented by markers arranged in a forest. In various implementations, the trace manager can preserve the relative positions of the markers in the forest, as if no markers are hidden, to show dependency. Alternatively, the trace manager may align the roots of the trees in the forest, e.g., to the left, to hide information related to the call structure of the hidden applications.

The trace manager can display metrics of the shown applications. For example, the trace manager displays latency indicators corresponding to the applications shown in the multi-tenant call stack 504. The trace manager can hide those latency indicators corresponding to the hidden applications.

In the example shown, the trace manger displays a multi-tenant call stack 504. In various implementations, the trace manager can display a multi-tenant call list, where markers representing applications are shown in a list ordered by latency. The trace manager can display a multi-tenant log pane 506, in which only log entries 108, 110 and 112, corresponding to the shown applications, are displayed. The log entry 114, corresponding to App 5, is filtered out and hidden.

Figure 6:
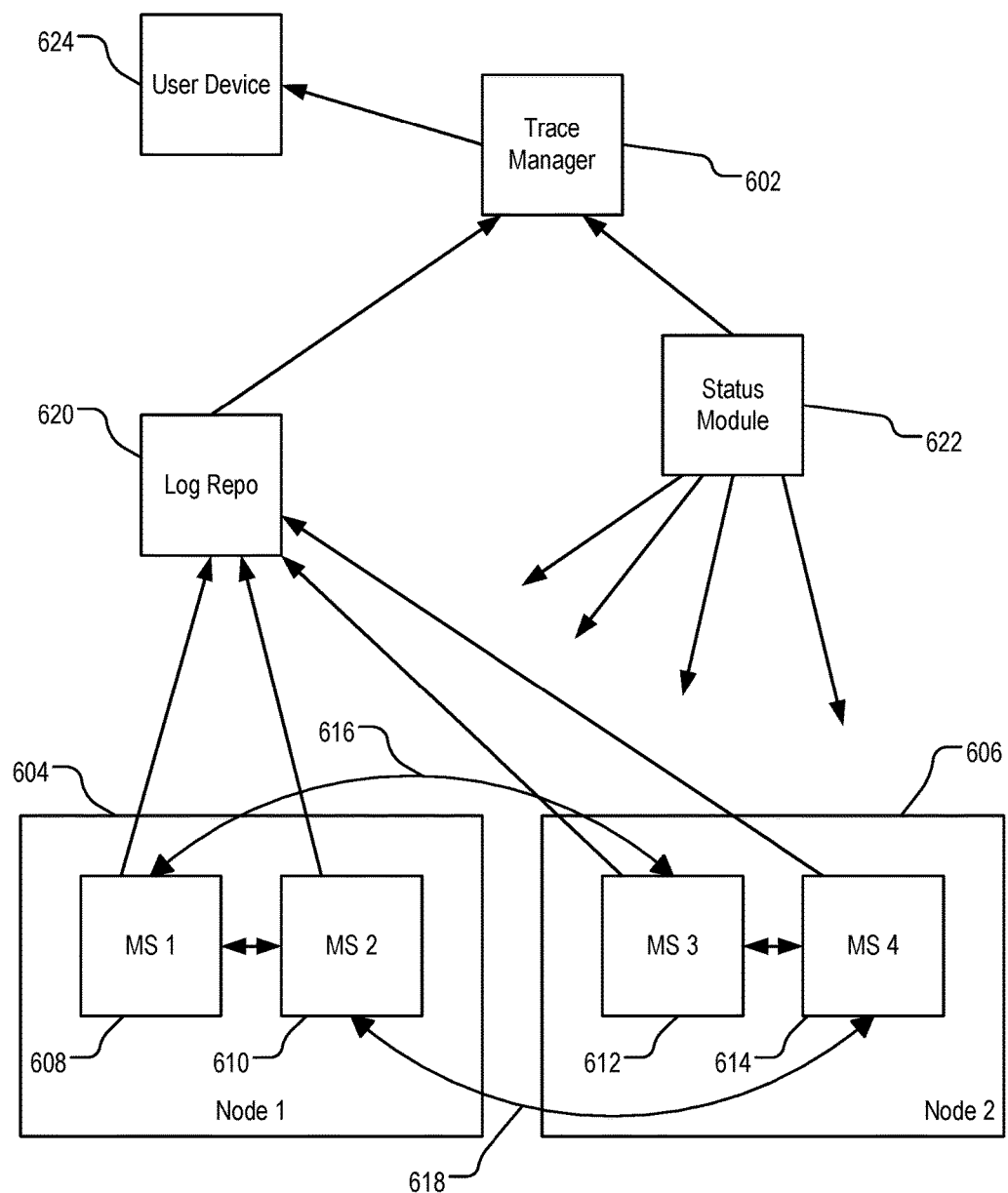
FIG. 6 is a block diagram illustrating a trace manager implemented in a microservice environment of a distributed computing platform.

FIG. 6 is a block diagram illustrating an example trace manager 602 in a microservice environment of a distributed computing platform. The trace manager 602 can be implemented on one or more computers each having one or more processors. The trace manager 602 can perform the operations including generating and managing the user interfaces 100 through 500 described in reference to FIGS. 1-5.

The distributed computing platform can include multiple nodes, e.g., a first node 604 and a second node 606. Each of the nodes 604 and 606 can include one or more computers or one or more virtual machines. Each of the nodes 604 and 606 can have a respective dedicated processor and storage device. Each of the nodes 604 and 606 can be configured to provide one or more microservices. For example, the first node 604 can provide a first microservice 608 and a second microservice 610. The second node 606 can provide a third microservice 612 and a fourth microservice 614. Each of the microservices 608, 610, 612 and 614 can include an independently deployable module providing one or more specific functions. Each of the microservices 608, 610, 612 and 614 can include one or more applications. A software system can be built to use the functions of the microservices 608, 610, 612 and 614. The microservices 608, 610, 612 and 614 may communicate with one another through one or more communication channels, e.g., communication channels 616 and 618.

The distributed computing platform includes a log repository 620. The log repository 620 can be implemented on a node of the distributed computing platform. Each of the microservices 608, 610, 612 and 614 may generate one or more log entries. Each of the microservices 608, 610, 612 and 614 can provide the log entries to store in the log repository 620. Each log entry can include a respective log message, a respective timestamp, a respective IP address and a respective application identifier.

The distributed computing platform includes a status module 622. The status module 622 can be implemented on a node of the distributed computing platform. The status module 622 can communicate with each of the microservices 608, 610, 612 and 614 to determine respective performance metrics of processes executing on the microservices 608, 610, 612 and 614. The metrics can include container metrics, network metrics, and event metrics. The container metrics can include CPU, memory and disk usage. The network metrics can include requests per second, HTTP errors per second, and request latency. The event metrics can include measurements on create, update, start, stop and crash.

The trace manager 602 retrieves the metrics generated by the status module 622, as well as log entries stored in the log repository 620. The trace manager then generates an integrated view of the metrics and the log entries. In the integrated view, a selection, sort, or filter of the metrics will trigger corresponding selection, sort, or filter of the log entries, and vice versa. The trace manager 602 can provide the integrated view to a trace consumption device, e.g., a user device 624, for storage or presentation.

In some implementations, the trace manager 602, the log repository 620 and the status module 622 are deployed as tiles using a deployment manager of the distributed computing platform. The deployment manager can include a virtual machine that orchestrates deployment of software as tiles. Each tile can include a software component that provides specified functions.

Figure 7:
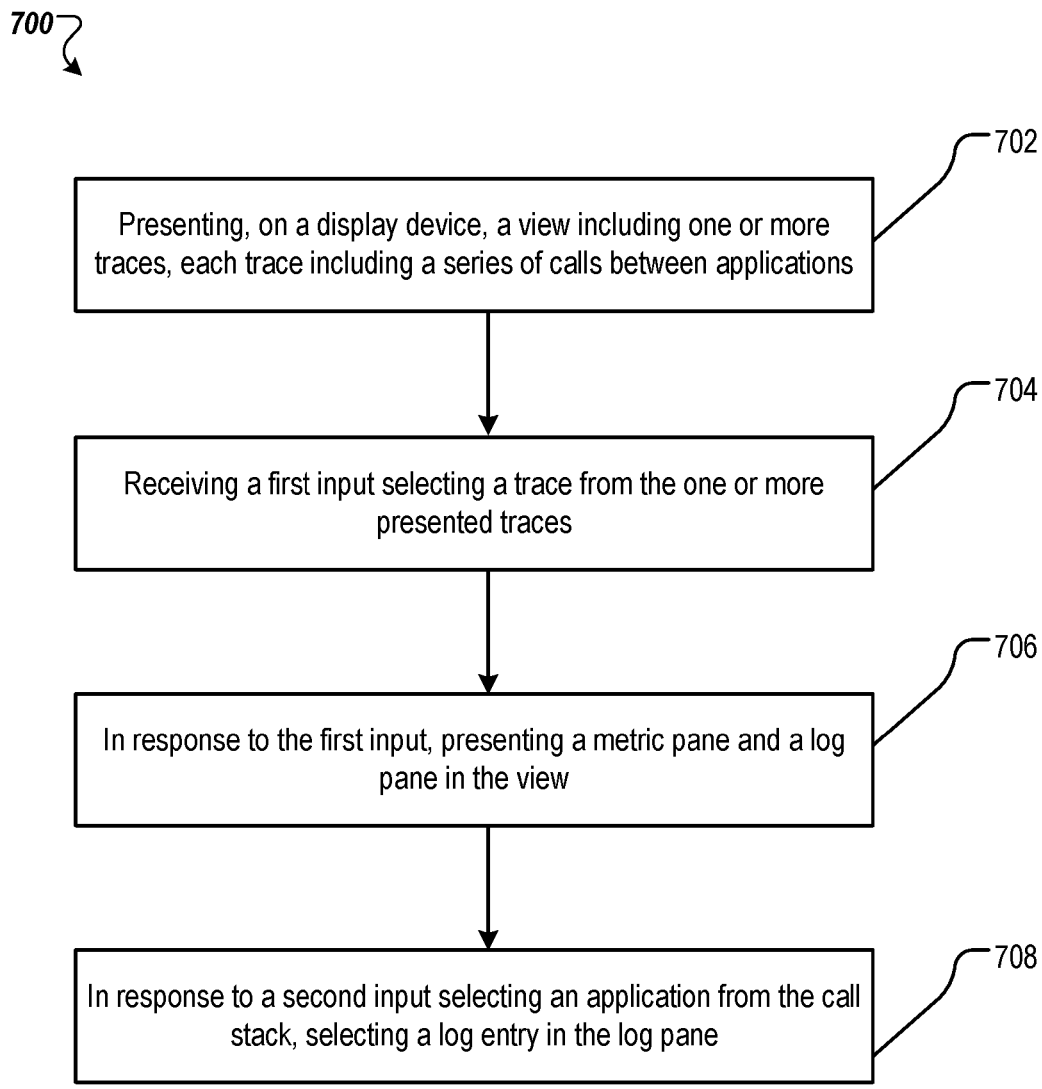
FIG. 7 is a flowchart illustrating an example process of trace management.

FIG. 7 is a flowchart illustrating an example process 700 of trace management. The process 700 can be performed by a system including a trace manager, e.g., the trace manager 602 of FIG. 6.

The system presents (702), on a display device, a view including one or more traces. Each trace includes a series of calls between applications of multiple microservices deployed on a distributed computing platform including one or more computer processors. At least one of the calls is an inter-microservice call. Each trace can be displayed as a text string on the display device.

The system receives (704) a first input selecting a trace from the one or more traces. The first input can be a touch input or a mouse click on the trace.

In response to the first input, the system presents (706) a status pane and a log pane in the view. The status pane displays a call stack of the applications that made the calls in the trace. The log pane displays log entries corresponding to the calls. The call stack includes identifiers of the applications arranged in a stacked display structure. The stacked display structure can include a tree-like structure that shows dependencies of the calls. The log entries are aggregated from the microservices. The log entries can be stored in a centralized log repository by microservices.

In the status pane, each identifier of an application in the call stack is displayed in association with a respective latency indicator. Each latency indicator represents a respective latency of the call of the application. The latency can be a time delay in responding to a request. In some implementations, the call stack is displayed in a multi-tenancy mode, wherein in the multi-tenancy mode, one or more applications from one or more microservices to which a user lacks access privileges are hidden from the display, causing the call stack to display a broken sequence of calls In response to a second input selecting an application from the call stack, the system selects (708) a log entry in the log pane that corresponds to the selected application by emphasizing the log entry. The second input selecting the application can include a selection of a latency indicator associated with the application. Emphasizing the log entry in the log pane can include hiding log entries corresponding to unselected applications in the log pane.

In some implementations, the second input selecting the application is a multi-selection input selecting the application and another application. Emphasizing the log entry is associated with emphasizing another log entry associated with the other application.

In some implementations, the system can receive a third input for sorting the applications based on latencies. In response to the third input, the system rearranges the call stack, including changing orders of the applications represented in the call stack from an order based on call sequence into an order based on the latencies.

In some implementations, a system presents, on a display device, a view including one or more traces. Each trace includes calls between applications of multiple microservices deployed on a distributed computing system including one or more computer processors.

The system receives a first input selecting a trace from the one or more presented traces. In response to the first input, the system presents a status pane and a log pane in the view. The status pane displays latency indicators of the calls in the trace. The log pane displays log entries corresponding to the calls. Each latency indicator corresponds to a respective call between two of the applications, the latency indicator representing a latency of the call. The log entries are aggregated from the microservices. The system can display a call stack in association with the latency indicators.

In response to a second input selecting a latency indicator of the latency indicators, the system emphasizes a log entry in the log pane generated by a call that corresponds to the selected latency indicator. The second input selecting the application can be a multi-selection input selecting the latency indicator and another latency indicator. Emphasizing the log entry can be associated with emphasizing another log entry associated with the other latency indicator.

In response to a third input for sorting the applications based on latencies, the system rearranges the latency indicators and the log entries based on latency time, e.g., longest latency first.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
presenting, on a display device, a view including one or more traces, each trace including calls between applications of a plurality of microservices deployed on a distributed computing system including one or more computer processors;
receiving a first input selecting a trace from the one or more presented traces;
in response to the first input, presenting a status pane and a log pane in the view, the status pane displaying a call stack of the applications that made the calls in the trace, the log pane displaying log entries corresponding to the calls, wherein:
the call stack includes identifiers of the applications arranged in a display structure that shows dependencies of the calls, and
the log entries are aggregated from the microservices; and
in response to a second input selecting an application from the call stack, emphasizing a log entry in the log pane that corresponds to the selected application.

2. The method of claim 1, wherein at least one of the calls is an inter-microservice call, and the log entries are stored in a centralized log repository by the plurality of microservices.

3. The method of claim 1, wherein:
each identifier of an application in the call stack is displayed in association with a respective latency indicator, each latency indicator representing a respective latency of a call of the application; and
the second input selecting the application comprises a selection of a latency indicator associated with the application.

4. The method of claim 3, comprising:
in response to a third input for sorting the applications based on latencies, rearranging the call stack, including changing orders of the applications represented in the call stack from an order based on call sequence into an order based on the latencies.

5. The method of claim 1, wherein emphasizing the log entry in the log pane comprises hiding log entries corresponding to unselected applications in the log pane.

6. The method of claim 1, wherein:
the second input selecting the application is a multi-selection input selecting the application and another application; and
emphasizing the log entry is associated with emphasizing another log entry associated with the other application.

7. The method of claim 1, wherein the call stack is displayed in a multi-tenancy mode, wherein in the multi-tenancy mode, one or more applications from one or more microservices to which a user lacks access privileges are hidden from the display, causing the call stack to display a broken sequence of calls.

8. A method comprising:
presenting, on a display device, a view including one or more traces, each trace including calls between applications of a plurality of microservices deployed on a distributed computing system including one or more computer processors;
receiving a first input selecting a trace from the one or more presented traces;
in response to the first input, presenting a status pane and a log pane in the view, the status pane displaying latency indicators of the calls in the trace, the log pane displaying log entries corresponding to the calls, wherein:
each latency indicator corresponds to a respective call between two of the applications, the latency indicator representing a latency of the call, and
the log entries are aggregated from the microservices; and
in response to a second input selecting a latency indicator of the latency indicators, emphasizing a log entry in the log pane generated by a call that corresponds to the selected latency indicator.

9. The method of claim 8, comprising:
in response to a third input for sorting the applications based on latencies, rearranging the latency indicators and the log entries based on latency time.

10. The method of claim 8, wherein:
the second input selecting the application is a multi-selection input selecting the latency indicator and another latency indicator; and
emphasizing the log entry is associated with emphasizing another log entry associated with the other latency indicator.

11. The method of claim 8, comprising displaying a call stack in association with the latency indicators.

12. A non-transitory computer readable storage medium storing instructions executable by a data processing apparatus and upon such execution cause the data processing apparatus to perform operations comprising:
presenting, on a display device, a view including one or more traces, each trace including calls between applications of a plurality of microservices deployed on a distributed computing system including one or more computer processors;
receiving a first input selecting a trace from the one or more presented traces;
in response to the first input, presenting a status pane and a log pane in the view, the status pane displaying latency indicators of the calls in the trace, the log pane displaying log entries corresponding to the calls, wherein:
each latency indicator corresponds to a respective call between two of the applications, the latency indicator representing a latency of the call, and
the log entries are aggregated from the microservices; and
in response to a second input selecting a latency indicator of the latency indicators, emphasizing a log entry in the log pane generated by a call that corresponds to the selected latency indicator.

13. The non-transitory computer readable storage medium of claim 12, the operations comprising:
in response to a third input for sorting the applications based on latencies, rearranging the latency indicators and the log entries based on latency time.

14. A system comprising:
one or more computers and one or more storage devices on which are stored instructions that are operable, when executed by the one or more computers, to cause the one or more computers to perform operations comprising:

presenting, on a display device, a view including one or more traces, each trace including calls between applications of a plurality of microservices deployed on a distributed computing system including one or more computer processors;

receiving a first input selecting a trace from the one or more presented traces;

in response to the first input, presenting a status pane and a log pane in the view, the status pane displaying a call stack of the applications that made the calls in the trace, the log pane displaying log entries corresponding to the calls, wherein:

the call stack includes identifiers of the applications arranged in a display structure that shows dependencies of the calls, and the log entries are aggregated from the microservices; and in response to a second input selecting an application from the call stack, emphasizing a log entry in the log pane that corresponds to the selected application.

15. The system of claim 14, wherein at least one of the calls is an inter-microservice call, and the log entries are stored in a centralized log repository by the plurality of microservices.

16. The system of claim 14, wherein:

each identifier of an application in the call stack is displayed in association with a respective latency indicator, each latency indicator representing a respective latency of a call of the application; and the second input selecting the application comprises a selection of a latency indicator associated with the application.

17. The system of claim 16, the operations comprising:

in response to a third input for sorting the applications based on latencies, rearranging the call stack, including changing orders of the applications represented in the call stack from an order based on call sequence into an order based on the latencies.

18. The system of claim 14, wherein emphasizing the log entry in the log pane comprises hiding log entries corresponding to unselected applications in the log pane.

19. The system of claim 14, wherein:

the second input selecting the application is a multi-selection input selecting the application and another application; and emphasizing the log entry is associated with emphasizing another log entry associated with the other application.

20. The system of claim 14, wherein the call stack is displayed in a multi-tenancy mode, wherein in the multi-tenancy mode, one or more applications from one or more microservices to which a user lacks access privileges are hidden from the display, causing the call stack to display a broken sequence of calls.

* * * * *